United States Patent [19]

Glennon et al.

[11] Patent Number: 4,608,527

[45] Date of Patent: Aug. 26, 1986

[54] PHASE ADVANCE WAVEFORM GENERATOR FOR BRUSHLESS DC ACTUATOR SYSTEM CONTROLLER

[75] Inventors: Timothy F. Glennon; Jayant G. Vaidya, both of Rockford, Ill.

[73] Assignee: Sundstrand Corporation, Rockford, Ill.

[21] Appl. No.: 451,642

[22] Filed: Dec. 20, 1982

[51] Int. Cl.⁴ .............................................. H02P 5/40
[52] U.S. Cl. .................................... 318/685; 318/723; 318/314
[58] Field of Search ...................... 318/685, 721–723, 318/314, 318

[56] References Cited

U.S. PATENT DOCUMENTS

| | | | |
|---|---|---|---|
| 3,361,949 | 1/1968 | Brown et al. | 318/314 |
| 3,628,114 | 12/1971 | Pattantyus | 318/314 |
| 3,824,437 | 7/1974 | Blaschke | 318/803 |
| 3,896,348 | 7/1975 | Loderer | 318/810 |
| 3,934,184 | 1/1976 | Bonig et al. | 318/799 |
| 4,041,361 | 8/1977 | Cornell | 318/432 |
| 4,042,862 | 8/1977 | Franklin | 318/800 |

OTHER PUBLICATIONS

Kenly et al., "Triac Speed Control of a Three-Phase Motor with Phase-Locked Loop Regulation" IEEE Transactions on Industry Applications, vol. IA-12, No. 5, Sep./Oct. 1976, pp. 492–498.

Primary Examiner—David Smith, Jr.
Attorney, Agent, or Firm—Harold A. Williamson; Ted E. Killingsworth; James A. Wanner

[57] ABSTRACT

This invention relates to a motor control circuit for a permanent magnet motor having a rotor and motor windings. A motor winding transformer circuit is coupled to motor windings and provides an output signal representative of the magnitude and direction of the real current present in the motor windings. A rotor speed/position sensing circuit provides an output signal representative of the motor speed and direction.

3 Claims, 16 Drawing Figures

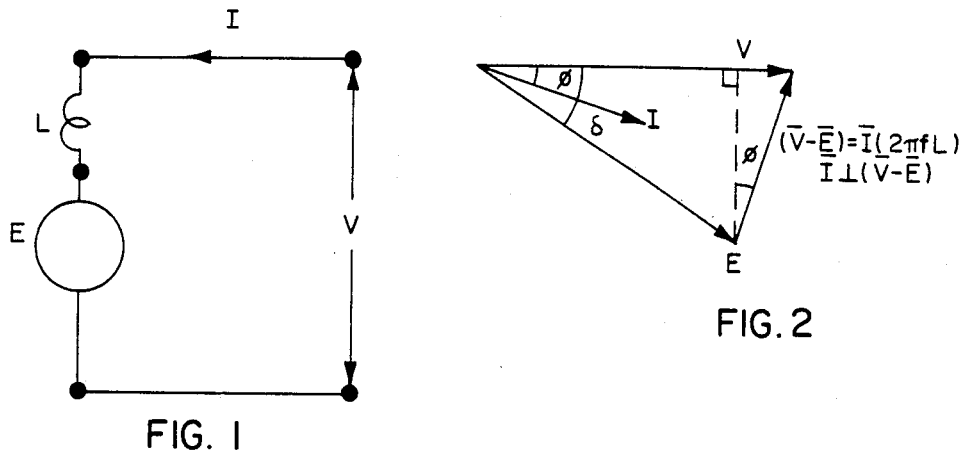
FIG. 1
FIG. 2
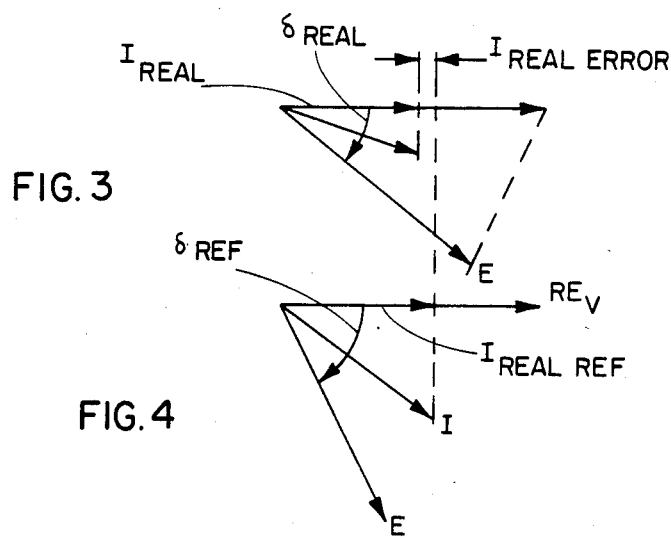
FIG. 3
FIG. 4
BLOCK DIAGRAM OF PHASE LOCKED LOOP
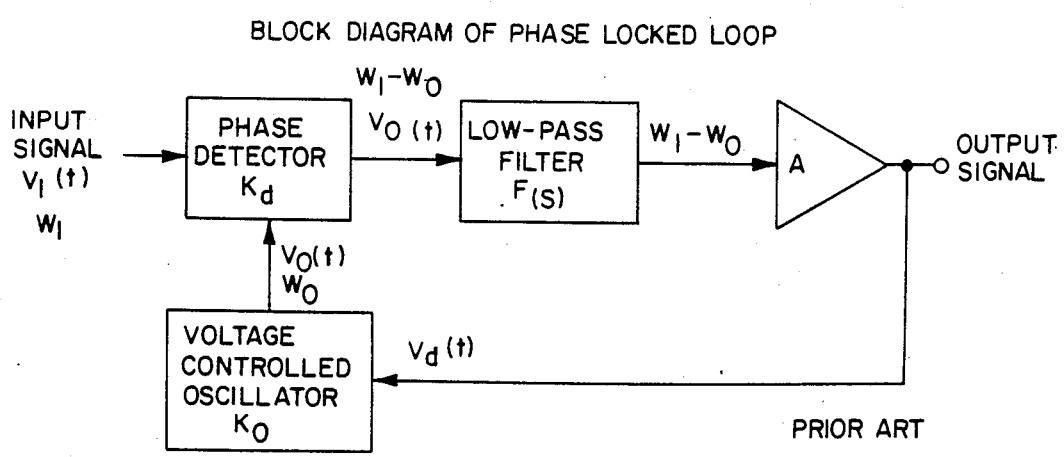
PRIOR ART
FIG. 13

$f = \frac{1}{T}$
WHERE
$T_1 = T_4$
AND
$T_2, T_3 > T_1$

FULL 180° CONDUCTIVE AT FREQ-f

WITH PHASE ADVANCE $\delta$

PHASE ADVANCE WAVEFORM GENERATOR FOR BRUSHLESS DC ACTUATOR SYSTEM CONTROLLER

TECHNICAL FIELD

This invention relates to a motor control circuit for a permanent magnet motor. The motor and motor control find particular applicability in providing for the actuation of flight control surfaces in an aerospace environment.

BACKGROUND ART

Brushless DC motors are generally required to operate under widely varying conditions of load. These varying conditions include: changes in torque, changes in speed, and resulting changes in power output. Changes in input voltage and commutation angle can be selected to suit the performance capabilities of the brushless DC motor. Of particular interest in respect to the invention to be described are DC motors utilizing permanent magnets, especially of the samarium cobalt type.

Interest in brushless DC motor control has spawned a myriad of technological approaches intended to be responsive to a variety of perceived needs to which the technical solutions have been offered. The invention to be described hereinafter recognizes that motor controls for brushless DC motor systems incorporate what is commonly referred to as open loop phase advance systems. These systems do not operate at optimum efficiency because the phase advance does not change with load demand.

In order to better define the inventive contribution detailed hereinafter, there is now offered a review of the state-of-the-art, beyond which the invention described in this specification will be distinguished.

A study of the prior art reveals that there are a technologically related family of patents which are directed to control circuits for brushless DC motors, which patents recognize the need for and utilize phase comparison circuits to obtain in part a desired motor control.

The prior art that has been uncovered that best describes the background of the invention is exemplified by the patents to Okuyama et al, U.S. Pat. No. 4,088,932 issued May 9, 1978; Alley et al, U.S. Pat. No. 4,250,435 issued February 10, 1981 and Lafuze U.S. Pat. No. 4,295,085 issued October 13, 1981.

Okuyama et al is directed to a control system for a commutatorless motor, in which a large variation in the gain of the current control circuit is prevented, and the speed control loop provided has a high quality of response. The principle feature of the Okuyama et al patent resides in the recognition of the desirability of maintaining the amplitude of the armature current constant when a torque reference signal takes a value smaller than the current intermittent threshold, and at the same time controlling the phase of the armature current in accordance with the torque reference signal so as to maintain the ratio of the output torque of the motor to the commanded or instructed torque substantially constant, independent of the load dependent current.

The invention to be described hereinafter approaches the motor load control in a uniquely different manner in that a real current error is detected and a phase shifted waveform to the motor windings is provided. The phase advanced waveform to the motor effectively corrects the real current error due to load which results in improved motor efficiency.

The Alley et al patent is directed to a motor velocity control system employing feedback to maintain actual motor rotational velocity at or near a desired rotational velocity. The speed control system employs an electronically commutated motor that is adaptable to digital velocity control.

In accordance with Alley et al there is provided a desired motor rotational velocity commanded by an input clock rate, which may be variable, rather than by a voltage or current signal. A sensor is provided for determining actual rotor position, and actual rotor position is periodically compared with instantaneous desired motor position as indicated by the time of occurance of one of the input clock signals or pulses. Depending upon the results of this periodic comparison, a dynamically established active current limit is modified. Specifically, if motor rotor actual position leads desired position, the current limit is reduced. If, on the other hand, actual motor position is lagging, the current limit is increased. If the rotor is in the correct position, the current limit is unchanged.

The invention to be described also employs a sensor to determine actual rotor position. However, the invention of this specification goes beyond a mere current control, in that a real error current error signal is generated that takes into account such factors of real current present in the motor windings, rotor speed and direction, a load position commanded versus an actual load position sensed. The real current error signal of the invention is representative of a phase angle that is proportional to real current error signal.

As will become more clear hereinafter, the detection and the use of real current error signal within the motor provides the key to efficient motor control, especially when load control is a primary objective.

The Lafuze patent is directed to a phase lock loop commutation position control and method for a drive system for a DC field motor having a rotor and a plurality of stator windings. The motor being a permanent magnet motor of the samarium cobalt type, is particularly applicable for use in a variable speed constant frequency (VSCF) motor/generator used in an aircraft environment.

In Lafuze, electric power is supplied to the stator windings of the motor in accordance with gating signals. The gating signals are generated in accordance with timing signals, which are provided in response to a clocking signal. A position signal is furnished as a function of the position of the rotor with respect to a preselected stator position. An error signal is generated proportionally to the phase difference between a selected timing signal and the position signal. The clocking signal is produced as a function of the error signal. In this way, the phase lock loop controls the supplying of the electric power to the stator windings in accordance with the position of the rotor.

In a number of respects the motor and motor winding arrangement of Lafuze is similar to the arrangement provided in the invention described in this specification. By indicating that Lafuze is similar to the invention of this specification it is intended to convey the thought noted at the outset, that Lafuze is like the invention of this specification in that both are directed to control circuits for brushless permanent magnet DC motors of the samarium cobalt type which recognize the need for and utilize phase comparison circuits to obtain in part a desired motor control. The invention of this specification distinguishes over Lafuze in that a real error current signal is provided that is a function of the difference between the magnitude and direction of a real reference current signal derived from an output signal representative of the rotor speed and direction, as well as, a load position command signal and an output signal indicative of a load position sensed. The invention to be described uniquely converts the real current error signal to a locked phase advance waveform signal that is utilized to control the motor in a load responsive manner.

In the prior art patents described above, the teachings were intended to convey the state of the relevant motor control art. In the invention to be described there is also provided a phase advance waveform generator that receives the real error current error signal mentioned, and provides a controlled locked phase advance waveform signal to control a DC power supply that furnishes power to the motor to be controlled. This waveform generator takes the form of a loop and uniquely performs and cooperates with the motor control circuit of the invention.

Two patents have been uncovered that, when once described, will afford the reader a basis for appreciating the inventive advance in the loop to be described in respect of the waveform generator.

The first of which is the patent to Konishi et al, U.S. Pat. No. 3,668,492 issued June 6, 1972, and the second, U.S. Pat. No. 3,887,820 issued June 3, 1975 to Glennon, one of the co-inventors of this invention.

The Konishi et al patent is directed to a servo system for controlling a motor. There is provided a servo loop that includes a phase comparator for providing an error signal representative of the phase difference between an input reference periodic signal and an oscillatory signal for driving a motor.

A voltage controlled oscillator controlled by the error signal to produce the oscillatory signal is provided with an integrator for integrating the error signal to produce an integration signal proportional to the result of the integration of the error signal and therefore to hold the instantaneous value of the integration signal when the error signal becomes zero. The integration signal is supplied to the oscillator in place of the error signal.

The controlled locked phase advance loop to be described hereinafter clearly departs from that suggested by Konishi et al. There is nothing in Konishi et al that would motivate someone skilled in the art to add a signal summing circuit between the phase comparator 14 and the integrator 22 to introduce an error signal that represents a desired phase shift in waveform of the signal to drive the motor. The absence of a summing circuit of the nature and at the location just described, as well as the failure to appreciate the significance of real current error renders the Konishi et al patent devoid of an anticipatory teaching of the control system of the invention.

The Glennon patent and its operation should be understood because such an understanding will enhance the readers awareness of the substantial departure the subject invention provides over the earlier fine piece of intellectual property.

Glennon is directed to paralleling control of phase synchronized generators, and teaches the use of a phase comparator and an integrator in a generator control system. The phase of the generator is compared with the phase of the reference signal and the output of the phase comparator is connected with a summing integrator, the output of which is a DC signal with an amplitude representing the cumulative angle of phase difference between the generator output and the reference and the polarity indicating whether the generator output leads or lags. The signal at the output of the summing integrator is used to control the variable speed drive for the generator. Only when the generator and reference are in substantial phase synchronism is the switch connecting the generator output in parallel with another source closed.

In the invention to be described there is provided a signal summing circuit between the phase comparator and integrator, which summing circuit allows an error signal to be introduced, which error signal produces a phase shifted waveform. Glennon's primary motive is to obtain control alternating signals in substantial phase synchronism while the invention to be described desires a controlled locked phase advance waveform signal.

DISCLOSURE OF THE INVENTION

More specifically, this invention relates to a motor control circuit for a permanent magnet motor having a rotor and motor windings. A motor winding transformer circuit is coupled to motor windings and provides an output signal representative of the magnitude and direction of the real current present in the motor windings. A rotor speed/position sensing circuit provides an output signal representative of the motor speed and direction.

A DC power supply circuit is coupled across the motor windings. The power supply provides a motor voltage waveform to the motor windings.

A load, such as a flight control surface is coupled to the motor to be positioned by the motor in response to a load position command signal from a flight control computer. A load position sensing circuit provides an output signal representative of the load position sensed.

The motor control circuit includes the following major sub-systems or circuits, namely, a real current error signal network or circuit; a phase advance waveform generator coupled to receive an input from the real current error signal circuit, and the power supply which receives from the phase advance waveform generator a phase advanced power supply control signal.

The real current error signal circuit receives the following four signals:
(a) the output signal representative of the magnitude and direction of the real current present in the motor winding,
(b) the output signal representative of the rotor speed and direction,
(c) the load position command signal, and
(d) the output signal representative of the load position sensed.

The real current error signal circuit provides an output signal that is a function of the difference between the magnitude and direction of a real reference current signal derived from the output signal representative of the rotor speed and direction, as well as the load position command signal and the output signal representative of the load position sensed, and additionally, the real current signal from the motor windings. It is to be understood that the real current error signal circuit output is representative of a phase angle that is proportional to the real current error signal.

The phase advance waveform generator is coupled to receive respectively the output signal representative of the phase angle proportional to the real current error signal and to the rotor position signal of the rotor speed and position sensing circuit.

The phase advance waveform generator provides a phase advanced power supply means control signal. The control signal causes the motor voltage waveform to be advanced by an amount equal in phase to the phase angle of the speed error signal circuit output signal to thereby efficiently effect a motor control that is responsive to load.

It is therefore a primary object of this invention to provide a motor load control circuit for a permanent magnet motor wherein the load control is efficiently effected by the detection of a real current error signal within the motor, and then utilizing the real current error signal to cause a phase advance motor voltage waveform from the motor power supply to achieve the desired load control.

Another object of this invention is to provide a motor control for a brushless DC motor system in which there is provided phase advance that is responsive to change with load demand.

Yet another object of the invention is to provide a phase controlled waveform generator for use in controlling a dynamic electrical device, such as a brushless DC motor that includes as part of the control of the dynamic device, the production of a controlled locked phase advance output waveform signal whose relationship to a sensed input is directly responsive to a desired phase.

In the attainment of the foregoing objects the invention contemplates a motor control circuit for a permanent magnet motor having a rotor, motor windings, motor winding current transformer circuit and a rotor speed/position sensing unit.

A power supply circuit is coupled across the motor windings. The power supply provides a motor voltage waveform to the motor windings.

A load to be positioned by the motor has coupled thereto a load position sensing circuit. The load is drivingly coupled to the motor rotor.

A command control unit provides a load position command signal to command a desired load position. The motor control circuit includes in combination:

Load position error detecting circuit which is coupled to the load position sensing circuit and to said command control unit. The load position error detecting circuit provides a load position error signal which is a function of the difference between a load position sensed and a load position commanded by the load position command signal.

A reference speed circuit receives the load position error signal and provides a reference speed signal output having a magnitude and direction proportional to a rotor speed required for a load position commanded by the load position command signal.

A speed signal summing circuit is coupled to the rotor speed/position sensing unit to receive a signal representative of the rotor speed. The summing circuit is additionally coupled to the reference speed circuit to receive the reference speed signal output. The summing circuit thereby provides a speed error signal which is a function of the difference and direction between the sensed rotor speed and the reference speed signal.

A separate circuit is provided to receive the speed error signal and provide a real current reference signal having a magnitude and direction representative of the real current required for the motor to establish the load position commanded.

A real current signal generating circuit is coupled to the current transformer. The real current signal generating circuit provides a signal representative of the magnitude and direction of the real current present in the motor windings.

A real current summing circuit is coupled through the separate circuit to receive the speed error signal and to the speed signal summing means to receive the real current reference signal. The real current summing circuit is additionally coupled to the real current signal generating circuit to receive the real current signal from the motor windings. The real current summing circuit provides a real current error signal which is a function of the difference between the magnitude and direction of the real difference current signal and the real current signal from the motor windings.

A signal converting circuit is provided for receiving the real current error signal and converting the real current error signal to an output signal representative of a phase angle that is proportional to the real current error signal.

A phase advance waveform generator is coupled to receive respectively said output signal representative of the phase angle proportional to said real current error signal of the signal converting circuit and to the rotor position signal of the rotor speed and position sensing unit.

The phase advance waveform generator provides a phase advanced power supply control signal.

The control signal causing the motor voltage waveform to be advanced by an amount equal in phase to the phase angle of the signal converting circuit output signal to thereby efficiently effect a motor control that is responsive to load.

In the preferred embodiment of the invention there is present an inventive feature that requires special attention in explaining how the attainment of the objects of the invention obtain fruition.

When one views the motor and the motor control circuit as a dynamic electrical device, and considers the phase advance waveform generator in cooperative combination therewith, it will be appreciated that from the description that follows, that in addition to the motor control invention described, there is also provided a controlled, locked, phase advance loop which forms the waveform generator.

It will be recalled from the above description that as part of the control of the motor or dynamic device machine there is provided a controlled, locked, phase advance output waveform signal which has a phase relationship to a sensed input which is directly responsive to a desired phase. The waveform generator includes a phase comparator having delivered thereto a sensed actual condition input pulse train signal obtained from the electrical device, and a desired input pulse train signal having a desired phase and the same frequency as the sensed pulse train signal.

The phase comparator compares the phase and frequency of the sensed input pulse train signal with the desired pulse train, and generates a linear error signal that is related to the phase difference between the sensed and the desired input signals.

A signal summing circuit is coupled to the phase comparator to receive the linear error signal and to receive an error signal representative of a phase angle proportional to a sensed condition and a desired condition in the dynamic electrical device.

The summing circuit provides an output signal to a voltage controlled oscillator (VCO) through an integrating circuit to thereby cause the integrating circuit to provide the VCO with a signal that causes said VCO to modify the time period of the VCO output to effect a desired phase shifted pulse train signal output to the phase comparator to thereby complete a loop. The signal which has been derived from said VCO signal is a controlled locked phase advance waveform signal that is to be utilized to control the dynamic electrical machine.

Other objects and advantages of the present invention will be apparent upon reference to the accompanying description when taken in conjunction with the following drawings.

BRIEF DESCRIPTION OF THE DRAWINGS

FIG. 1 is a schematic showing of one phase of a permanent magnet brushless DC motor,
FIG. 2 is a phasor diagram of motor, current, voltage and back e.m.f. components present in a motor of the type shown in FIG. 1,
FIG. 3 is a phasor diagram illustrating actual real current brought into being by there being a load on the motor,
FIG. 4 is a phasor diagram of motor, current, voltage and back e.m.f. components that should be present in the motor if a new or desired load position were to be established in the motor in response to a command,
FIG. 13 is a phase lock loop diagaram of the prior art.

BEST MODE FOR CARRYING OUT THE INVENTION

Figure 5:
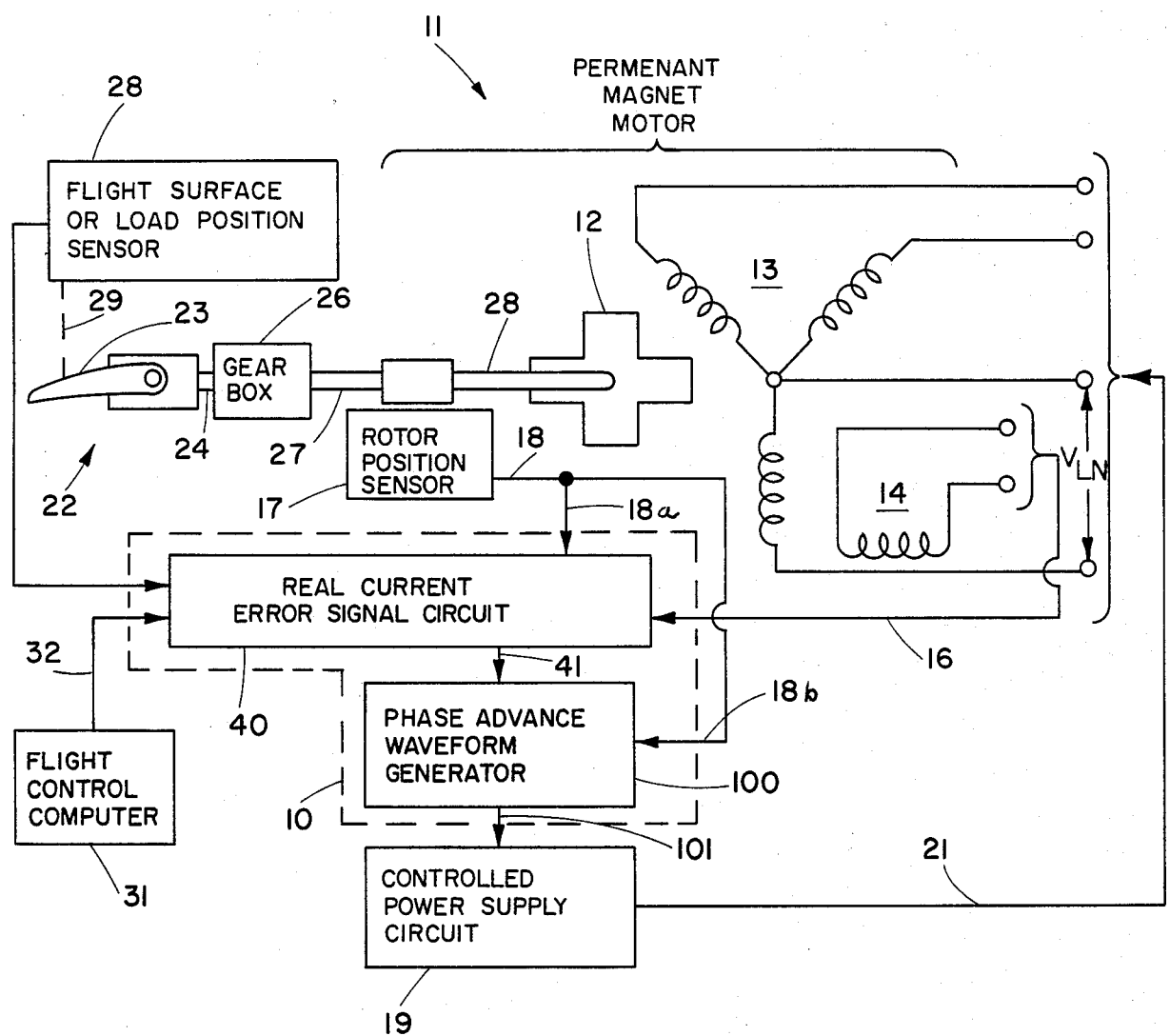
FIG. 5 is a block diagram of the preferred embodiment of the invention.

In order to better appreciate the nature of the inventive contribution, there will be provided next a brief technical review of the theoretical operation of a permanent magnet motor of a type which the motor circuit of the invention finds particular utility.

In the review that follows, a simplified model will be employed which represents one phase of a multiphase, permanent magnet field brushless motor.

Attention is now directed to FIG. 1 which represents schematically one phase of a permanent magnet field brushless motor having an n-phase winding.

If the winding resistance is neglected, this phase can be represented schematically as shown in FIG. 1. The applied voltage is V volts r.m.s. per phase and the back e.m.f. is E volts r.m.s. per phase. Let us assume that both V and E are sinusoidal. The winding inductance is L henry. Let us assume that there is no magnetic saturation in the armature iron so that the value of L remains constant regardless of changes in current. Since most of the machines to which this analysis is applied are likely to use permanent magnets with the relative permeability close to one (such as ceramic or samarium cobalt magnets), it is safe to assume that the winding inductance L remains practically constant regardless of the angular position of the field with respect to the armature winding.

Defining the r.m.s. value of the current in the phase under consideration as I amperes, $$\bar{I} = \frac{\bar{V} - \bar{E}}{j 2\pi fL}, \tag{1}$$

where $\bar{I}$, $\bar{V}$, $\bar{E}$ are phasor quantities and f equals the frequency in Hertz. Defining the commutation angle as $\delta$ radians and the power factor angle as $\phi$ radians, the phasor diagrams with all the quantities can be drawn as shown in FIG. 2. The power input to the motor is given by $$P = n \; VI \cos\phi \tag{2}$$

This is also the power output if all the losses such as iron losses and windage and friction losses are neglected for our simplified model. By examination of the phasor diagram, $$I = \frac{E \sin\delta}{j \, 2\pi \, fL \, (\cos \phi)} \tag{3}$$

Combining equations (2) and (3) above, $$P = \frac{nVE \sin\delta}{j \, 2\pi \, fL} \tag{4}$$

This is the well-known power equation for the cylindrical rotor synchronous machines.

Certain general comments can be made regarding the brushless DC motor on the basis of equations (2), (3), and (4). These are as follows:

(a) The power is proportional to the back e.m.f. E. This can be increased at the cost of increased weight of the permanent magnet field as well as the armature.

(b) The power is inversely proportional to the inductance L. Thus if the number of turns in the armature is increased to increase the back e.m.f., the inductance increases in proportion to the square of the number of turns. This will in fact reduce the power.

(c) To keep the motor current as low as possible, the power factor, $\cos \phi$ must be kept close to 1. However any attempt to increase $\cos \phi$ requires changes in the back e.m.f. E and the commutation angle When a permanent magnet motor of the type just described receives energy to its motor windings in the form of a motor voltage waveform delivered in a conventional manner, the voltage V, current I and the back e.m.f. E can be shown graphically as was done in FIG. 2. There also can be shown graphically what is termed the real current $I_{REAL}$ which is vertically projected on the real or horizontal axis. For purposes of this description and the description of the invention there can be represented a real current phasor component that indicates a desired or commanded state. In the phasor diagram there can also be illustrated an actual real current phasor component that represents the real current phasor that arises due to a load on the motor. In FIG. 3

$I_{REAL}$ is intended to depict the actual real current phasor representative of the real current in the motor winding that arises as a consequence of the motor experiencing a load. In FIG. 4 positioned beneath FIG. 3, there is depicted a phasor diagram wherein there is shown what is termed an $I_{REAL}$ reference.

$I_{REAL}$ reference represents that real current required to provide the power necessary for the load commanded. I represents terminal motor current. In FIG. 3, for a given $I_{REAL}$ there is the inherent δ REAL which represents a phase angle that is a function of the actual load. In FIG. 4 for a commanded or desired load current there is shown a $δ_{REF}$ which represents a phase angle that is a function of the required current for the load commanded. The projection of $I_{REAL}$ REF of FIG. 4 on FIG. 3 reveals what is graphically shown as $I_{REAL}$ ERROR and is the phasor difference of $I_{REAL}$ and $I_{REAL}$ REF. It is this real current error signal that the invention to be described is intended to measure and then utilize in providing a phase shifted waveform power signal to the motor winding to correct for the error that arises due to the load. When a position has been commanded of the motor through its motor control circuit, and a load is present, it becomes desirable to have the motor quickly and efficiently perform as if the desired or commanded real current phasor component and the actual real current phasor component were of the same magnitude and direction. As noted above, the invention recognizes that this desirable end may be accomplished by the phase of the motor voltage waveform in response to the real current error—$I_{REAL}$ ERROR.

The motor control system that accomplishes this phase adjustment is new and will be described in detail first. Also new is a waveform generator which forms a portion of the motor control circuit and will be described generally in respect of its role in the motor control, and specifically in respect of the novelty present in the phase controlled, locked loop that constitutes the waveform generator.

Reference is now made to FIG. 5 which illustrates in block diagram form a motor control circuit embodying the invention in conjunction with the actuation of an aircraft flight control surface.

Figure 6:
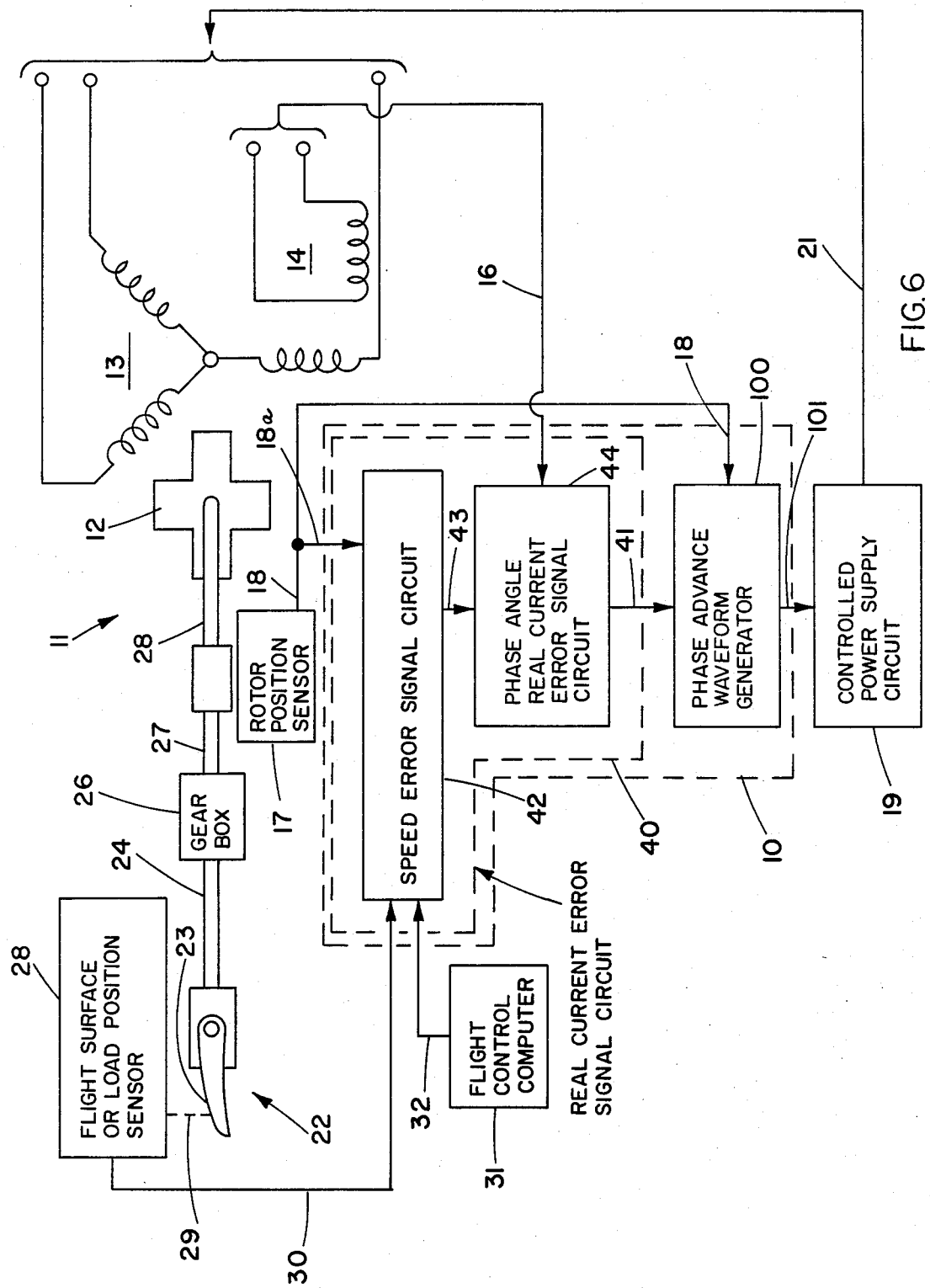
FIG. 6 is a block diagram in an expanded form of the preferred embodiment of the invention.
Figure 7:
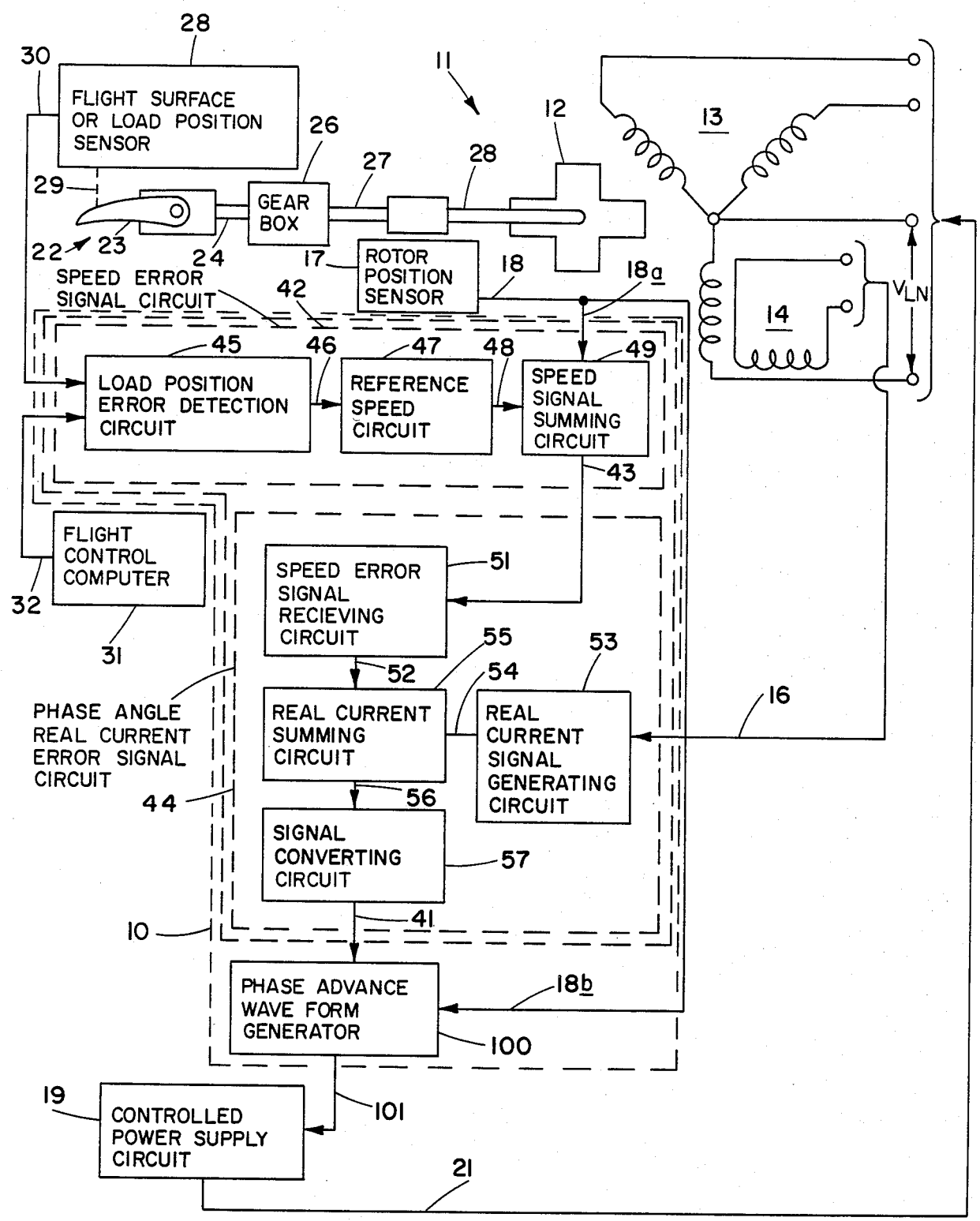
FIG. 7 is another block diagram of the invention in a still more expanded form.

Reference is now made to the series of FIGS. 5, 6 and 7, all of which are directed to the preferred embodiment of the invention and are intended to provide in expanding detail the components essential to carrying out the invention. In these figures, as well as those that follow, the same reference numerals used in one figure will be used in other figures to indicate the same component or function.

Figure 8:
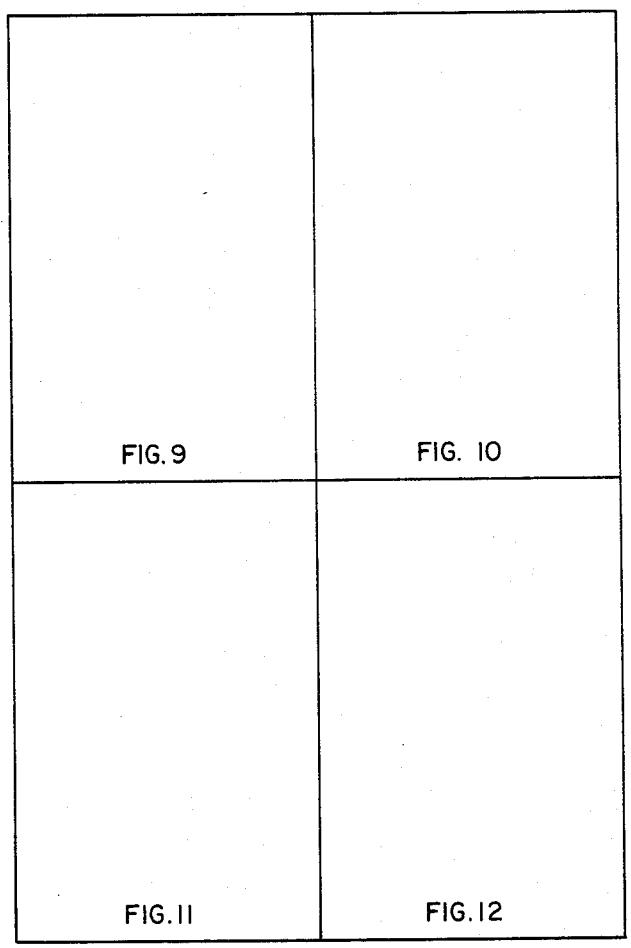
FIG. 8 is an illustration of how to assemble FIGS. 9, 10, 11 and 12.
Figure 9:
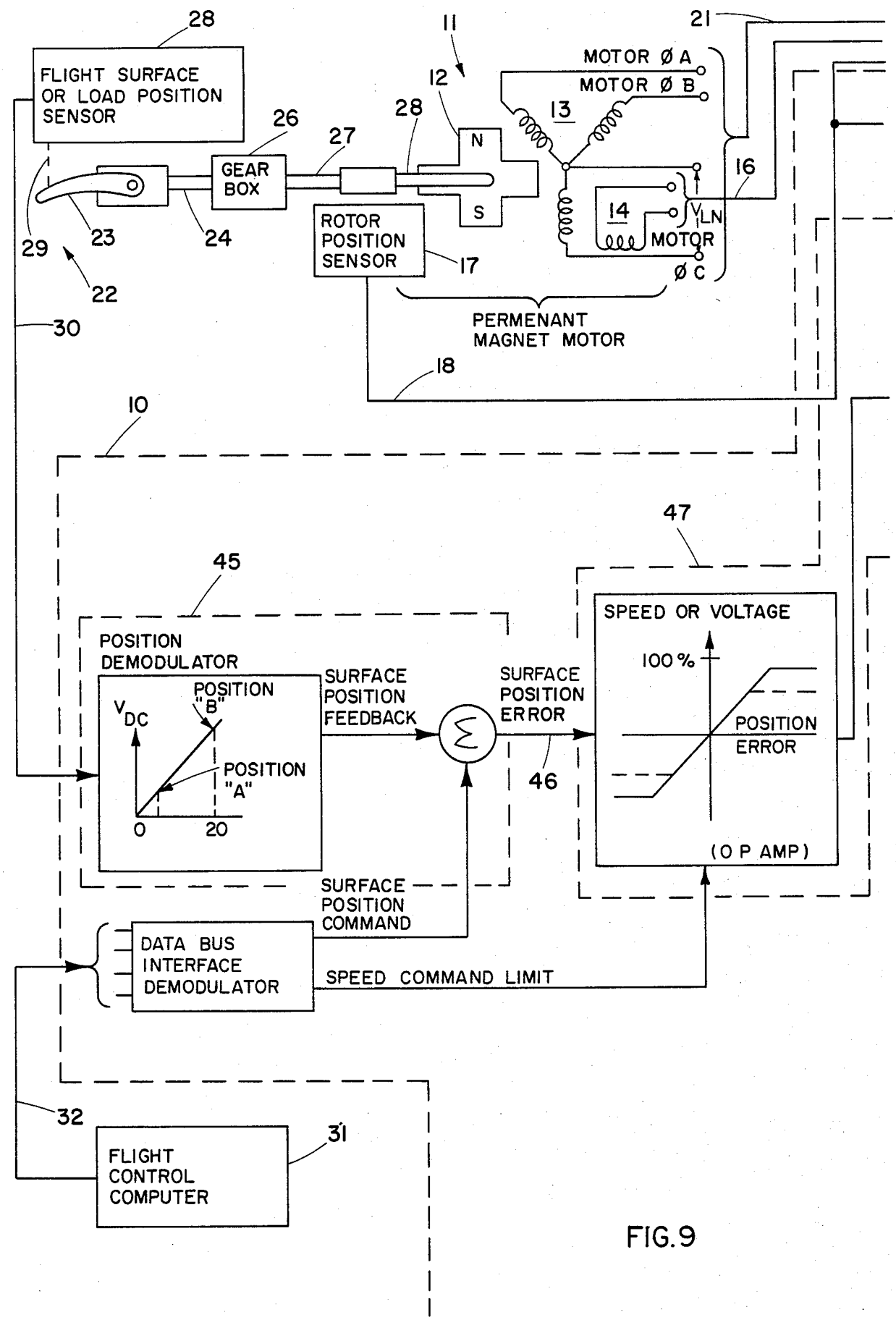
FIG. 9 is a portion of FIG. 8.
Figure 10:
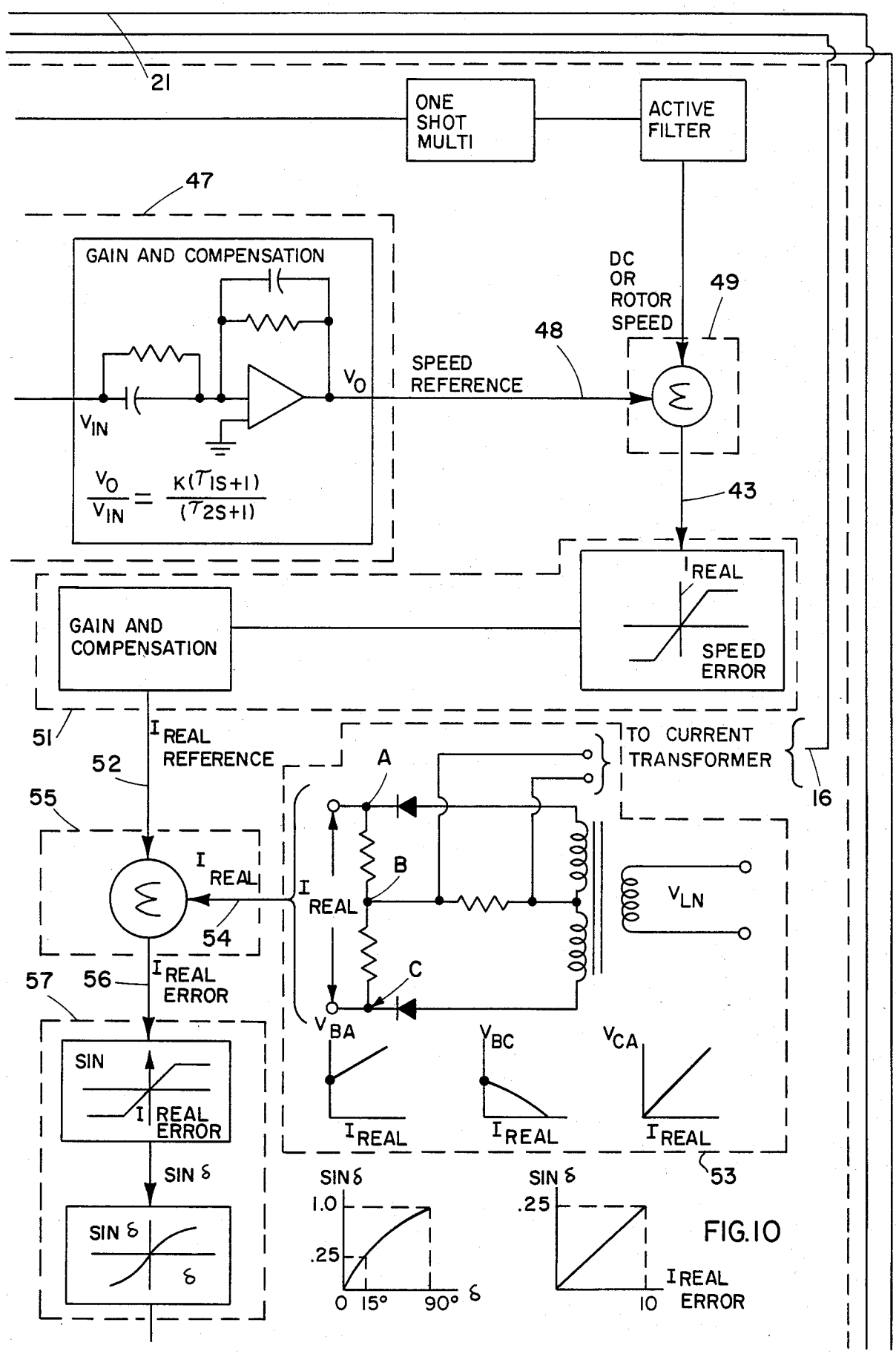
FIG. 10 is a portion of FIG. 8.

FIG. 8 of the drawings illustrates a schematic assembly of four sheets of drawings, namely FIGS. 9, 10, 11 and 12, which when assembled will provide a completely detailed description of the preferred embodiment of the invention.

In FIG. 5 there are shown the basic combination of elements from which the inventive contribution will be defined.

As noted at the outset, the motor control circuit of the invention finds utility in providing a motor control for a brushless DC permanent magnet motor employed to drive the flight control surfaces of an aerospace vehicle. With this in mind, attention is now directed to the specific content of FIG. 5 in which there is shown a motor control circuit 10 for a permanent magnet motor 11 having a rotor 12 and motor windings 13. A motor winding current transformer circuit 14 of conventional design, positioned as shown, provides an output signal on lead 16 representative of the current present in the motor windings 13. A rotor position sensor 17 is shown adjacent rotor 12 and shaft arrangement 27, 28. The rotor position sensor is of a conventional design, and may include Hall effect devices. The rotor position sensor 17 provides on lead 18, an output signal representative of the motor speed and direction. The rotor position sensor output is delivered via leads 18, 18a to a real error current signal circuit 40 and by leads 18, 18b to the phase advance waveform generator 100.

Figure 16:
Figure 16:

A controlled power supply circuit 19 is coupled across the motor windings 13 as shown by the single lead line 21 emanating from the power supply circuit 19. There is present on lead 21 a motor voltage waveform of the type shown in FIG. 16 which is delivered to the motor windings 13.

A load generally indicated by the reference numeral 22 and associated arrow is in this embodiment as flight control surface 23, such as an aircraft flap. The flight control surface 23 is drivingly coupled to the rotor 12 via shaft 24, gear box 26, and shafts 27, 28. This driving connection is totally conventional in nature.

Adjacent the load 22 and coupled by broken line 29 is flight surface or load position sensor 28. The load position sensor provides an output signal on lead 30 to the real error current signal circuit 40 representative of the load position sensed.

A flight control computer 31 provides a load position command signal on lead 32 to the real current error signal circuit 40 of the motor control circuit 10. The command signal is intended to cause the flight control surface or load to move to given positions such as, extended—retracted; deployed—stowed or any position between the extremes designated.

The motor control circuit 10 includes the real current error signal circuit 40 and the phase advance waveform generator 100.

The real current error signal circuit 40 receives the output signal on lead 16 from current transformer circuit 14, which signal is representative of the current present in the motor winding, i.e., real and reactive current.

The real current error signal circuit 40 also receives the output signal from the rotor position sensor 17 via leads 18, 18a which provides an input of rotor speed and direction. The load position command signal from the flight control computer 31, as well as an output signal from the load position sensor 28 is representative of the load position sensed.

The real current error signal circuit 40 provides an output signal 41 that is a function of the difference between the magnitude and direction of a real reference current signal derived from said output signal 18 representative of the rotor speed and direction, as well as the load position command signal 32 and said output signal 30 representative of the load position sensed, and the real current signal 16 from said motor windings.

The real current error signal circuit 40 output signal 41 is representative of a phase angle that is proportional to the real current error signal.

The phase advance waveform generator 100 is coupled to receive respectively said output signal 41 representative of said phase angle proportional to said real current error signal and the rotor position signal 18 of said rotor speed and position sensor 17.

The phase advance waveform generator 100 provides a phase advanced power supply circuit control signal 101.

The control signal 101 causes the motor voltage waveform on lead 21 to be advanced by an amount equal in phase to said phase angle of the real current error signal circuit output signal 41 to thereby efficiently effect a motor control that is responsive to load.

Reference is now made to FIG. 6 which depicts in a conceptually expanded sense, the identical invention in the same preferred embodiment of FIG. 5. A study of FIG. 6 reveals that the real current error signal circuit 40 herein shown in broken line, and in solid line in FIG. 5 is comprised of two basic functional components, namely a speed error signal circuit 42 having an output signal 43 delivered to a phase angle real current error signal circuit 44.

The description that now follows will not go into the total operation of the entire motor control circuit, but will dwell on function and cooperation between all the components shown in FIG. 6 to the extent that they are involved with the speed error signal circuit 42, and the phase angle real current error signal circuit 44 that make up the real current error signal circuit 40.

The speed error signal circuit 42 is coupled via lead 30 to load position sensor 28, as well as the flight control computer 31 via lead 32. It will be observed that the rotor position sensor 17 is also coupled to the speed error signal circuit 42 via leads 18, 18a. This arrangement allows the speed error signal circuit to receive a load position sensed signal and a load position command signal to thereby provide a load position error signal which is converted to a reference speed signal output having a magnitude and direction proportional to a rotor speed required for a load position commanded by the load position command signal from the flight control computer 31.

The reference speed signal output is combined with a rotor speed signal from said rotor speed/position sensing circuit 17 to thereby provide a speed error signal 43 which is a function of the difference and direction between said sensed rotor speed and said reference speed signal.

A phase angle real current error signal circuit 44 is coupled, as shown, to said speed error signal circuit 42 and to said motor winding current transformer circuit 14 via lead 16.

The phase angle real current error signal circuit 44 simultaneously converts the speed error signal 43 into a real current reference signal representative of the real current required for the motor 11 to establish the load position commanded and for converting a motor current signal from the motor winding current transformer circuit to a real current signal representative of the real current present in said motor windings 13.

The real current reference signal in a manner to be described more completely hereinafter is summed with said real current signal to provide an output signal representative of a phase angle that is proportional to a real current error signal present as an output on lead 41.

As has been described earlier, the phase advance waveform generator 100 is coupled to receive respectively the output signal representative of the phase angle proportional to the real current error signal and the rotor position signal of the rotor speed and position sensor.

The phase advance waveform generator provides a phase advanced power supply means control signal to cause the motor voltage waveform to be advanced by an amount equal in phase to said phase angle of said signal converting means output signal to thereby efficiently effect a motor control that is responsive to load.

Reference is now made to FIG. 7 which depicts in an even greater conceptually expanded sense the identical invention of FIGS. 5 and 6. A study of FIG. 7 reveals that the speed error signal circuit 40 of FIG. 5 shown here in FIG. 7 in dotted outline includes three functional components, namely a load position error detection circuit 45 coupled by lead 46 to a reference speed circuit 47 and by lead 48 to a signal summing circuit 49.

The phase angle real current error signal circuit 44 of FIG. 5 shown here in FIG. 7 in dotted outline has been expanded to include four basic functional components. The first of the four basic components of phase angle real current error signal circuit 44 is a speed error signal receiving circuit 51 which is coupled to the signal summing circuit 49 via lead 43 and real current summing circuit 55 by lead 52. A real current signal generating circuit 53 is interposed between the real current summing circuit 55 and the current transformer circuit 14. The final functional component is that which has been designated as a signal converting circuit 57 which receives an output signal on lead 56 from the real current summing circuit 55.

The load position error detection circuit 45 is coupled to said load position sensor and to the flight control computer 31. The load position error detecting circuit 45 provides a load position error signal on lead 46 which is a function of the difference between a load position sensed and a load position commanded by a lead position command signal on lead 32 from the flight control computer.

A reference speed circuit 47 receives the load position error signal on lead 46, and provides a reference speed signal output on lead 48 which output signal has a magnitude and direction proportional to a rotor speed required for a load position commanded by the load position command signal from the flight control computer 31.

The speed signal summing circuit 49 is coupled to the rotor speed/position sensor 17 to receive a signal via leads 18, 18a representative of the rotor speed. The summing circuit 49 is additionally coupled to the reference speed circuit 47 to receive the reference speed signal output. The summing circuit thereby provides a signal output which is a function of the difference and direction between said sensed rotor speed and said reference speed signal.

A speed error receiving circuit 51 receives the speed error signal and provides a real current reference signal having a magnitude and direction representative of the real current required for the motor to establish the load position commanded.

The real current summing circuit 55 is coupled through the circuit 51 means to receive said speed error signal and to said speed signal summing circuit 49 to receive the real current reference signal. The real current summing circuit 55 is additionally coupled via lead 54 to the real current signal generating circuit 53 to receive said real current signal from the motor windings 13. The real current summing circuit 55 provides a real current error signal on lead 56 which is a function of the difference between the magnitude and direction of the real reference current signal and the real current signal from the motor windings 13.

A signal converting circuit 57 is provided to receive the real current error signal on lead 56 and convert the real current error signal to an output signal representative of a phase angle that is proportional to the real current error signal.

The phase advance waveform generator 100 is coupled to receive respectively said output signal on lead 41 that is representative of the phase angle proportional to the real current error signal of the signal converting circuit 57 and the rotor position signal on lead 18b of the rotor speed and position sensor 17.

The phase advance waveform generator 100 will be described in expanded detail hereinafter which provides a phase advanced power supply circuit control signal on lead 101 to cause the motor voltage waveform to be advanced by an amount equal in phase to the phase angle of the signal converting circuit 57 output signal 41 to thereby efficiently effect a motor control that is responsive to load.

When FIG. 8 has been assembled in the manner indicated, the most expanded detail of the invention can be appreciated. Each of the identified components of the assembled drawing figure are conventional electronic devices as can be readily seen from the legends that abound within and around the various components. The advance waveform generator 100 will however require explanation.

No separate detailed explanation need be offered of the arrangement of FIG. 8 because the reader need only return to the description next above and apply the language to the drawing of FIG. 8, and observe that for one skilled in the art, the added graphic details of FIG. 8 will afford such a person all that is necessary to accomplish the invention without undue experimentation.

Figure 11:
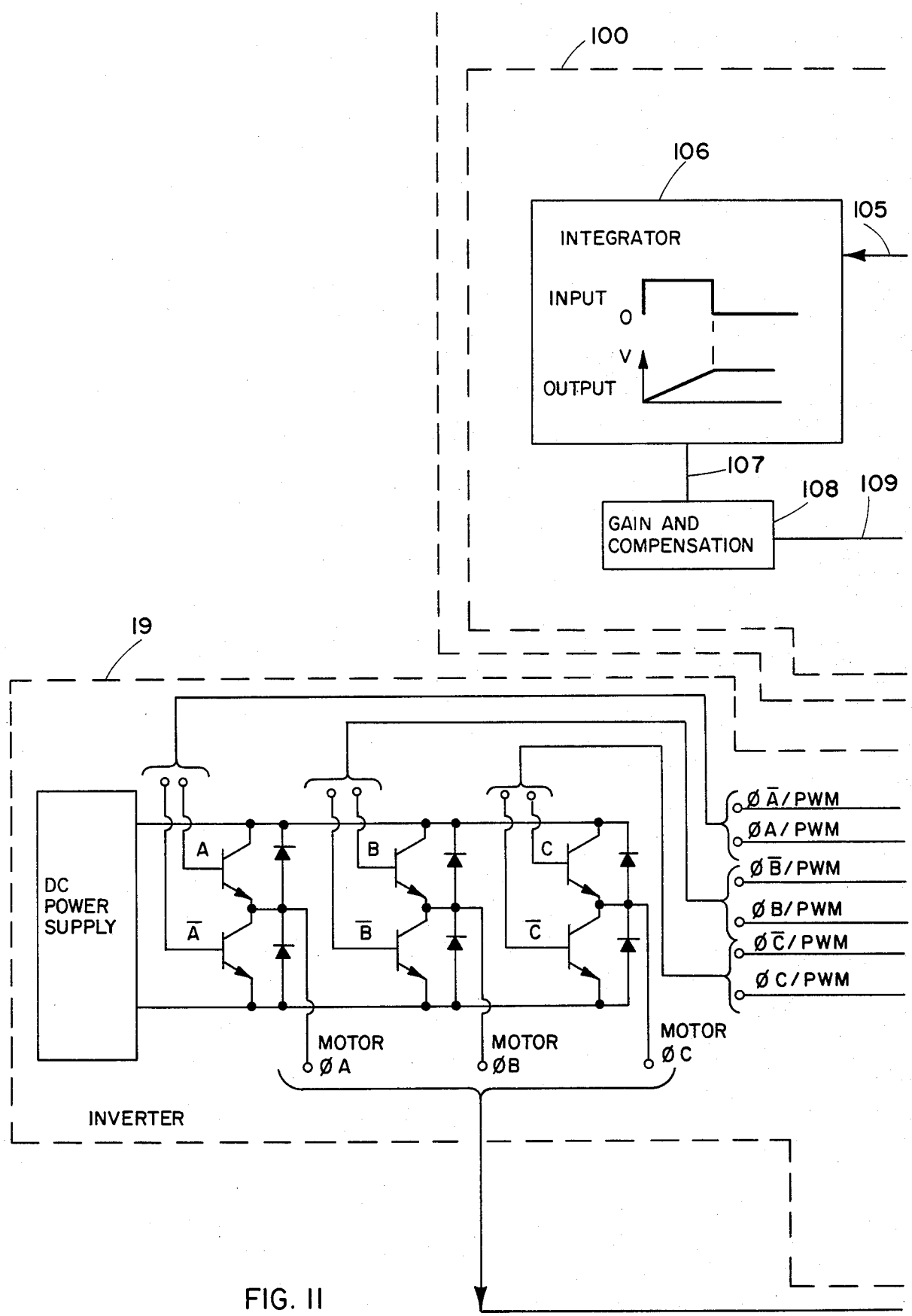
FIG. 11 is a portion of FIG. 8.
Figure 12:
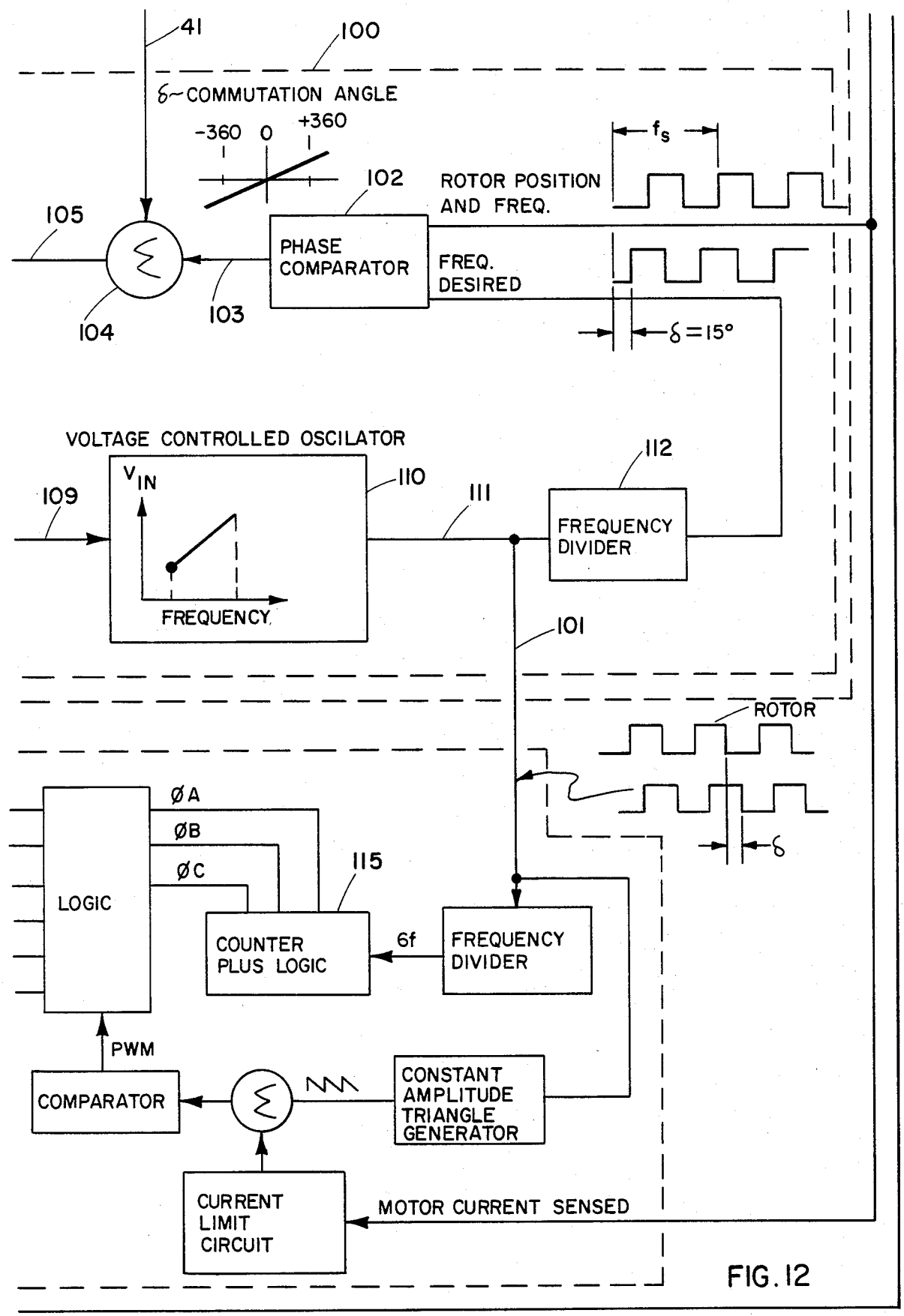
FIG. 12 is a portion of FIG. 8.

Referring now to FIG. 8 and the phase advance waveform generator 100 which is readily viewable when FIGS. 11 and 12 are in an assembled condition.

The phase advance waveform generator 100 of the invention includes a loop that is a feedback system comprised of a phase comparator 102, a summing circuit 104 into which is introduced via lead 103 a DC level signal representative of a phase change desired in an output from the loop. An integrating circuit 105, gain and compensation circuit 108, velocity controlled oscillator 110 and a frequency divider 112 complete the loop. The cooperation of these just recited components of the loop will be described in expanded detail hereinafter.

In contrast to the loop of the phase advance loop of the invention, there is the well known phase locked loop (PLL) common in the prior art as shown in FIG. 13. The PLL of FIG. 13 depicts a feedback system of the type described in "Signetics Linear Phase Locked Loops Applications Book" published in 1972. The feedback system is comprised of a phase comparator, a low pass filter and an error amplifier in the forward signal path, and a voltage controlled oscillator (VCO) in the feedback path. The PLL operation can be briefly explained in the following manner:

With no signal input applied to the system, the error voltage $V_d$ is equal to zero. The VCO operates at a set frequency w which is known as the free-running frequency. If an input signal is applied to the system, the phase comparator compares the phase and the frequency of the input with the VCO frequency and generates an error voltage $V_e(t)$ that is related to the phase and the frequency difference between the two signals. This error voltage is then filtered, amplified and applied to the control terminal of the VCO. In this manner, the control voltage $V_d(t)$ forces the VCO frequency to vary in a direction that reduces the frequency difference between $f_o$ and the input signal. If the input frequency $w_i$ is sufficiently close to $w_o$, the feedback nature of the PLL causes the VCO to synchronize or lock with the incoming signal. Once in lock, the VCO frequency is identical to the input signal except for a finite phase difference. This net phase difference $w_o$ is necessary to generate the corrective error voltage $V_d$ to shift the VCO frequency from its free-running value to the input signal frequency W; and, thus, keep the PLL in lock. This self-correcting ability of the system also allows the PLL to track the frequency changes of the input signal once it is locked.

The phase controlled waveform generator embodying the invention includes the phase comparator 102 which has delivered thereto a sensed actual condition in the form of an input pulse train signal, such as pulse train 98 above lead 18b. The pulse train 98 represents the signal from the rotor position sensor 17. The phase comparator 102 has a second input on lead 113 which represents a desired input pulse train signal 99 that has the desired phase shift. The sensed pulse train signal 98 has a phase and frequency related to the rotor speed and position condition within the motor. The desired input pulse train 99 should possess the desired phase and have the same frequency as the sensed pulse train signal which includes the phase comparator 102 which has delivered thereto a sensed actual condition input pulse train signal obtained from the rotor position sensor 17 via leads 18, 18b, and a desired input pulse train signal, said sensed pulse train signal having a phase and frequency related to a sensed condition within said dynamic electrical device and said desired input pulse train signal having a desired phase and the same frequency as the sensed pulse train signal.

The phase comparator 102 compares the phase and frequency of the sensed input pulse train signal with the desired input pulse train signal, and generates a linear error signal that is related to the phase difference between said sensed and desired input signals.

A signal summing circuit 104 is coupled via lead 103 to the phase comparator 102 to receive said linear error signal and to receive an error signal representative of a phase angle proportional to a sensed and a desired condition in the motor. The error signal is of course the signal present on lead 41.

The summing circuit 104 provides an output signal on lead 105 to a voltage controlled oscillator 110 VCO through an integrating circuit 106 to thereby cause the integrating circuit to provide said VCO with a signal that causes said VCO to modify the time period of the VCO output to effect a desired phase shifted pulse train signal output to the phase comparator 102 to thereby complete a loop which has derived from said VCO signal, a controlled locked phase advance waveform signal 101 that is to be utilized to control the motor.

Figure 14:
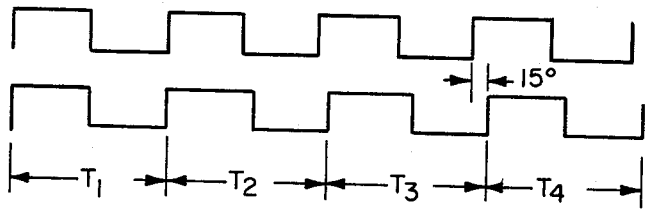
FIGS. 14, 15 and 16 are all waveform.

The nature of the integrating circuit 106 and its effect on the pulse train can be seen in FIG. 14 where it can be seen that from time period $T_1$ through time period $T_3$ the time period has been caused to expand to introduce the phase shift desired. In this figure the phase shift is shown as 15°. It should be kept in mind that this is a zero error system with respect to phase, and we have frequency lock with relative phase control.

Figure 15:
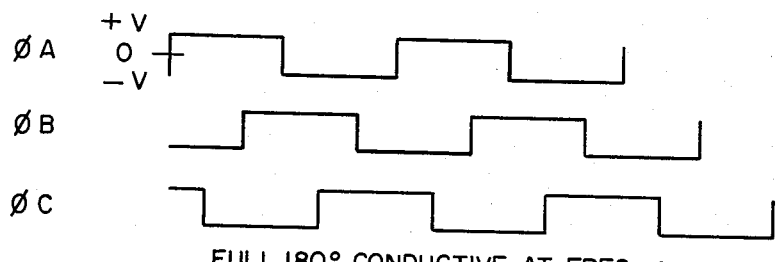

FIG. 15 indicates the nature of the signals delivered from the counter prior to pulse with modulation to provide the φ A/PWM signal with phase advance that appears on lead 21 to the motor to effect the efficient load control sought by the invention.

Although this invention has been illustrated and described in connection with the particular embodiments illustrated, it will be apparent to those skilled in the art that various changes may be made therein without departing from the spirit of the invention as set forth in the appended claims.

We claim:

1. A motor control circuit for a permanent magnet motor having a rotor, motor windings, motor winding current transformer means and a rotor speed/position sensing means,
   a power supply means coupled across said motor windings, said power supply providing a motor voltage waveform to said motor windings,
   a load to be positioned by said motor, a load position sensing means, said load drivingly coupled to said motor rotor,
   command means to provide a load position command signal to command a load position, said motor control circuit including in combination:
   load position error detecting means coupled to said load position sensing means and to said command means, said load position error detecting means providing a load position error signal which is a function of the difference between a load position sensed and a load position commanded by said load position command signal,
   reference speed means receiving said load position error signal and providing a reference speed signal output having a magnitude and direction proportional to a rotor speed required for a load position commanded by said load position command signal,
   speed signal summing means coupled to said rotor speed/position sensing means to receive a signal representative of said rotor speed, said signal summing means additionally coupled to said reference speed means to receive said reference speed signal output, said summing means thereby providing a speed error signal which is a function of the difference and direction between said sensed rotor speed and said reference speed signal,
   means to receive said speed error signal and provide a real current reference signal having a magnitude and direction representative of the real current required for said motor to establish said load position commanded,
   real current signal generating means coupled to said current transformer, said real current signal generating means providing a signal representative of the magnitude and direction of the real current present in said motor windings,
   real current summing means coupled through said means to receive said speed error signal and to said speed signal summing means to receive said real current reference signal, said real current summing means additionally coupled to said real current signal generating means to receive said real current signal from said motor winding, said real current summing means providing a real current error signal which is a function of the difference between the magnitude and direction of said real reference current signal and said real current signal from said motor windings,
   signal converting means for receiving said real current error signal and converting said real current error signal to an output signal representative of a phase angle that is proportional to said real current error signal,
   a phase advance waveform generator coupled to receive respectively said output signal representative of said phase angle proportional to said real current error signal of said signal converting means and to said rotor position signal of said rotor speed and position sensing means,
   said phase advance waveform generator providing a phase advanced power supply means control signal,
   said control signal causing said motor voltage waveform to be advanced by an amount equal in phase to said phase angle of said signal converting means output signal to thereby efficiently effect a motor control that is responsive to load.

2. A motor control circuit for a synchronous motor having a rotor, motor windings, motor winding current transformer means and a rotor speed/position sensing means,
   a power supply means coupled across said motor windings, said power supply providing a motor voltage waveform to said motor windings,
   a load to be positioned by said motor, a load position sensing means said load drivingly coupled to said motor rotor,
   command means to provide a load position command signal to command a load position, said motor control circuit including in combination:
   speed error signal means coupled to said load position sensing means, said load position command means and said rotor speed/position sensing means to receive a load position sensed signal and a load position command signal to thereby provide a load position error signal which is converted to a reference speed signal output having a magnitude and direction proportional to a rotor speed required for a load position commanded by said load position command signal,
   said reference speed signal output being combined with a rotor speed signal from said rotor speed/position sensing means to thereby provide a speed error signal which is a function of the difference and direction between said sensed rotor speed and said reference speed signal,
   phase angle real current error signal means coupled to said speed error signal means and to said motor winding current transformer means,
   said phase angle real current error signal means simultaneously converting said speed error signal into a real current reference signal representative of the real current required for said motor to establish said load position commanded and converting a motor current signal from said motor winding current transformer means to a real current signal representative of the real current present in said motor windings,
   said real current reference signal being summed with said real current signal to provide an output signal representative of a phase angle that is proportional to a real current error signal,
   a phase advance waveform generator coupled to receive respectively said output signal representative of said phase angle proportional to said real current error signal of said signal converting means and to said rotor position signal of said rotor speed and position sensing means, said phase advance waveform generator providing a phase advanced power supply means control signal, said control signal causing said motor voltage waveform to be advanced by an amount equal in phase to said phase angle of said signal converting means output signal to thereby efficiently effect a motor control that is responsive to load.

3. A motor control circuit for a permanent magnet motor having a rotor, motor windings, motor winding current transformer means providing an output signal representative of the magnitude and direction of the real current present in said motor windings and a rotor speed/position sensing means providing an output signal representative of the motor speed and direction, a power supply means coupled across said motor windings, said power supply providing a motor voltage waveform to said motor windings, a load to be positioned by said motor, a load position sensing means providing an output signal representative of the load position sensed, said load drivingly coupled to said motor rotor, command means to provide a load position command signal to command a load position, said motor control circuit including in combination:

A.
real current error signal means receiving
(a) said output signal representative of the magnitude and direction of the real current present in said motor winding,
(b) said output signal representative of the rotor speed and direction,
(c) said load position command signal, and
(d) said output signal representative of the load position sensed, said real current error signal means providing an output signal that is a function of the difference between the magnitude and direction of a real reference current signal derived from said output signal representative of the rotor speed and direction, as well as said load position command signal and said output signal representative of the load position sensed, and said real current signal from said motor windings;

said real current error signal mean output signal representative of a phase angle that is proportional to said real current error signal, B.
a phase advance waveform generator coupled to receive respectively said output signal representative of said phase angle proportional to said real current error signal and said rotor position signal of said rotor speed and position sensing means, said phase advance waveform generator providing a phase advanced power supply means control signal, C.
said control signal causing said motor voltage waveform to be advanced by an amount equal in phase to said phase angle of said real current error signal means output signal to thereby efficiently effect a motor control that is responsive to load.

* * * * *